United States Patent [19]

Scheibli et al.

[11] Patent Number: 4,647,285

[45] Date of Patent: Mar. 3, 1987

[54] PROCESS FOR PRINTING CELLULOSIC FIBRES WITH REACTIVE DYE AND $C_{3-18}$ ALIPHATIC CARBOXYLATE SALT FIXING AGENT

[75] Inventors: Peter Scheibli, Bottmingen; Alex Känzig, Therwil; Andres Schaub, Biel-Benken, all of Switzerland

[73] Assignee: Ciba-Geigy Corporation, Ardsley, N.Y.

[21] Appl. No.: 778,110

[22] Filed: Sep. 20, 1985

[30] Foreign Application Priority Data

Oct. 2, 1984 [CH] Switzerland ........................ 4735/84

[51] Int. Cl.[4] ........................ C09B 67/24; D06P 3/66

[52] U.S. Cl. ........................................ 8/528; 8/532; 8/543; 8/546; 8/549; 8/594; 8/598; 8/918

[58] Field of Search .................... 8/598, 543, 594, 528

[56] References Cited

U.S. PATENT DOCUMENTS 3,770,371 11/1973 Bossard et al. ........................ 8/598
3,816,067 6/1974 Pelster et al. ........................ 8/543
4,062,643 12/1977 Boehmke et al. ........................ 8/549
4,222,742 9/1980 Berry ........................ 8/455
4,391,607 7/1983 Hildebrand ........................ 8/549
4,588,411 5/1986 Scheibli et al. ........................ 8/528

FOREIGN PATENT DOCUMENTS 3049170 10/1981 Fed. Rep. of Germany .
1220302 1/1971 United Kingdom .

OTHER PUBLICATIONS

L. W. C. Miles, Textile Printing, (1981), pp. 160 and 161.

*Primary Examiner*—A. Lionel Clingman
*Attorney, Agent, or Firm*—Edward McC. Roberts; Meredith C. Findlay; Kevin T. Mansfield

[57] ABSTRACT

The invention relates to a process for printing cellulosic fibres or cellulose-containing blend fibres with reactive dyes or dye mixtures which contain a reactive dye and subsequent fixation, which comprises printing these materials with a print paste containing at least one water-soluble reactive dye of the formula $$D-(X)_m \qquad (1)$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aromatic or heterocyclic series which is bonded to the radical D either directly or via a bridge member and m is 1, 2, 3, 4, 5 or 6, and salts of aliphatic carboxylic acids having 3 to 18 carbon atoms, and subsequently fixing the print; and to the print pastes used and to their use for printing textile materials.

30 Claims, No Drawings

PROCESS FOR PRINTING CELLULOSIC FIBRES WITH REACTIVE DYE AND $C_{3-18}$ ALIPHATIC CARBOXYLATE SALT FIXING AGENT

Processes for printing cellulosic fibres have been known for a long time; in view of the ever higher fastness demands on the dyes used in the print pastes, the class of reactive dyes has become established. Printing with reactive dyes on cellulosic fibres utilises the fairly stable covalent bond of the dyes to the hydroxyl groups of the fibre. Reactive dyes are bonded (fixed) to the fibre in an alkaline medium. The choice of a suitable fixing alkali depends in the main on the reactivity of the reactive dyes used. They are generally fixed with sodium carbonate or sodium hydrogen-carbonate or with a mixture of sodium carbonate or sodium hydrogencarbonate and urea in order to obtain adequate degrees of fixation. Print pastes which contain sodium carbonate or sodium hydrogencarbonate with or without urea, however, are felt to be disadvantageous in practice, since these print pastes have a short shelflife. The critical factor for the shelflife of a print paste is its pH.

Also known are processes for printing cellulose-containing blend fibres, in particular polyester/cellulose blend fabrics, with dye mixtures which consist of disperse and reactive dyes and contain, as fixing alkali, sodium acetate and can, if desired, also contain dicyanodiamide or urea. These processes were developed to prevent any unfavourable interaction of disperse dyes, dispersants and reactive dyes in the presence of alkali metal salts. These processes are held to have the disadvantage of a limited choice of possible reactive groups on the reactive dye.

There was a demand for new processes which do not have the stated disadvantages.

It has now been found that the process described hereinafter meets these demands.

The present invention accordingly provides a process for printing cellulosic fibres or cellulose-containing blend fibres with reactive dyes or dye mixtures which contain a reactive dye and subsequent fixation, which comprises printing these materials with a print paste containing (a) at least one water-soluble reactive dye of the formula $$D—(X)_m \qquad (1)$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aromatic or heterocyclic series which is bonded to the radical D either directly or via a bridge member and m is 1, 2, 3, 4, 5 or 6, and (b) salts of aliphatic carboxylic acids having 3 to 8 carbon atoms, and subsequently fixing the print.

Surprisingly, the process according to the invention is equally well applicable to pure cellulosic fibres on the one hand and cellulose-containing blend fibres on the other without being limited to certain fibre-reactive groups on the reactive dyes; a further surprise are the high degrees of fixation obtainable despite the mild fixing alkali. The print pastes which are used in the process according to the invention and which are likewise provided by the present invention have a shelflife of several weeks, as required by those active in the field. It is also surprising that the addition of urea can be completely dispensed with. In the printing of cellulosic fibres or of blend fabrics containing cellulosic fibres, the presence of urea in the print paste in the process according to the invention even has a disadvantageous effect on the degree of fixation.

It is a feature of the invention that salts of aliphatic carboxylic acids having 3 to 18 carbon atoms are used.

The print pastes used in the process according to the invention also contain, as thickening agents, the customary thickeners, in particular alginates, for example sodium alginate, and emulsions or semi-emulsions. Besides these, however, it is also possible to use carob bean flour ether, crystal gum, starch ether, tragacanth and cellulose ether; with the last-mentioned group of compounds there is a danger, in the case of some reactive dyes, that these dyes will react with the thickening agent, thereby rendering the thickening agent insoluble in water and so possibly causing hardening of the fibre.

As further additives, the print pastes can contain, for some reactive dyes, solubilisers such as ε-caprolactam, thiodiethylene glycol, polyethylene glycol, pentaerythritol, acetin (mixture of glycol mono-, di- and triacetate) or dicyanodiamide.

Further additives which are generally customary in print pastes are sodium m-nitrobenzenesulfonate as an oxidising agent, aqueous formaldehyde solution and water.

The amount of fixing alkali in the print pastes used depends on the kind and number of fibre-reactive radicals X which contain one or more reactive leaving groups and/or activated double bonds. Reactive leaving groups is to be understood as meaning leaving groups which are suitable for the nucleophilic substitution reaction with the hydroxyl groups of cellulose in the presence of alkali, for example the halogen atoms of 2,4-difluoro-5-chloropyrimidinyl or 2-fluoro-4-amino-1,3,5-triazinyl reactive radicals. Activated double bond is to be understood as meaning a double bond which is suitable for addition onto the hydroxyl groups of the cellulose, for example the vinylsulfonyl reactive radical. Reactive radicals which react with the fibre in accordance with the nucleophilic addition mechanism frequently go through a preliminary elimination stage, as does for example the β-sulfatoethylsulfonyl or the β-sulfatoethylaminosulfonyl reactive radical in eliminating one equivalent of sulfuric acid. These reactive radicals require a correspondingly greater amount of fixing alkali. The minimum amount of fixing alkali to be used in the process according to the invention, namely the equimolar amount of a salt of an aliphatic carboxylic acid, relates to the reaction step leading to the dye-fibre bond.

It is preferable to use in the process according to the invention print pastes which contain, per fibre-reactive radical X, twice to five times, in particular at least three times to five times, the stoichiometric amount of fixing alkali.

A suitable upper limit for the ratio of fibre-reactive radical to fixing alkali has been found to be six times the stoichiometric amount of fixing alkali per fibre-reactive radical X.

Higher fixing alkali contents do not lead to either even better shelflife or further improved obtainable degrees of fixation.

Possible fixing alkalis are salts of aliphatic carboxylic acids, in particular alkali metal salts, such as lithium, potassium and especially sodium salts, of unsaturated and especially saturated, branched or unbranched monocarboxylic or dicarboxylic acids, or mixtures thereof, in particular alkali metal salts of aliphatic carboxylic acids having 3 to 8 carbon atoms.

It is preferable to use in the process according to the invention the alkali metal salt, in particular the sodium or potassium salt, of a saturated monocarboxylic acid.

Suitable salts of aliphatic carboxyic acids are for example the sodium or potassium salts of the following carboxylic acids: propionic acid, butyric acid, isobutyric acid, n-valeric acid, pivalic acid, caproic acid, oenanthic acid, caprylic acid, capric acid, lauric acid, myristic acid, palmitic acid, stearic acid, acrylic acid, oleic acid, elaidic acid, linoleic acid, linolenic acid, cyclohexanecarboxylic acid, malonic acid, succinic acid, glutaric acid, adipic acid, pimelic acid, suberic acid, azelaic acid, sebacic acid, maleic acid, fumaric acid.

In the process according to the invention it is very particularly preferred to use sodium propionate as the fixing alkali.

The invention also provides a process for printing cellulose-containing blend fibres, in particular a process for printing polyester/cellulose blend fabrics which comprises using a print paste which additionally contains at least one disperse dye.

The dye is fixed on pure cellulosic fibres using customary methods in which fixing time and fixing temperature depend on the fibre material and the reactivity of the reactive dyes used. To obtain uniform and optimal fixation of dye it is generally sufficient to steam at 100° to 105° C. in saturated steam for between 5 and 15 minutes. By means of high-temperature steaming or dry heat steam it is possible to obtain fixation at 105°-190° C. in the course of 20 seconds to to 8 minutes. More particularly, the reactive dyes are fixed with steam at a temperature of 100° C. to 150° C. for 30 seconds to 12 minutes, in particular for 2 to 10 minutes. On blend fabrics such as polyester/cellulose blend fabrics, the dye mixtures containing at least one reactive dye and one disperse dye are fixed at 100° to 220° C., the fixing time being in particular between 10 seconds and 10 minutes and preferably 150° C. to 200° C.

The prints are completed by rinsing in hot and/or cold water and if desired subsequently washing in the presence of a commercially available detergent, then rinsing in water and drying.

Possible cellulosic fibres are natural fibres, such as cotton and linen (bleached), and regenerated fibres, such as viscose, polynosics and cuprammonium rayon. Printing takes place in the main on woven and knitted fabrics produced from these fibres.

Examples of suitable disperse dyes are the dyes described in the Colour Index as Disperse Dyes.

In the process according to the invention, the reactive dyes of the formula (1) can contain up to six reactive radicals of the same or different types.

It is preferable to use in the process according to the invention print pastes containing water-soluble reactive dyes of the formula $$[D-(X)_m+(SO_3^{\ominus}Ka)_n \quad (2)$$

in which D is the radical of a monoazo or disazo dye or of a metal complex azo, anthraquinone, formazan or dioxazine dye, Ka is a cation, n is 1, 2, 3, 4, 5 or 6, and X and m are as defined under the formula (1). In particular, m is 1 or 2 and, independently thereof, n is 2, 3 or 4.

The water-soluble reactive dyes of the formula (1) can be the dye radicals D given under the formula (1) which contain one to six, in particular up to two, reactive radicals X.

Fibre-reactive radicals X are to be understood as meaning fibre-reactive radicals which are capable of reacting with the hydroxyl groups of cellulose, the amino, carboxyl, hydroxyl and thiol groups in wool and silk or with the amino and possibly carboxyl groups of nylons to form covalent chemical bonds.

X preferably is a fibre-reactive radical of the aliphatic, aromatic or heterocyclic series which is bonded to the radical D either directly or via a bridge member.

Preferably X is bonded to the radical D directly or via an amino group, which can be monoalkylated, for example via —NH—, —$N(CH_3)$—, —$N(C_2H_5)$— or —$N(C_3H_7)$— or via a bridge member containing an amino group.

Examples of what the fibre-reactive radicals X in the formula (1) can be are the following aliphatic and aromatic radicals:

vinylsulfonyl, β-chloroethylsulfonyl, β-sulfatoethylsulfonyl, acetoxyethylsulfonyl, phosphonooxyethylsulfonyl, β-thiosulfatoethylsulfonyl, N-methyl-N-(β-sulfatoethylsulfonyl)amino, acryloyl, monochloroacryloyl, dichloroacryloyl or trichloroacryloyl such as —CO—CCl=$CH_2$, —CO—CH=CH—Cl, —CO—CCl=CH—$CH_3$; monobromoacryloyl, dibromoacryloyl or tribromoacryloyl such as —CO—CBr=$CH_2$, —CO—CH=CH—Br, —CO—CBr=CH—$CH_3$; as well as —CO—CCl=CH—COOH, —CO—CH=CCl—COOH, —CO—CBr=CH—COOH, —CO—CH=C-Br—COOH; —CO—CCl=CCl—COOH, —CO—CBr=CBr—COOH; precursors of the acryloyl radical and of derivatives of the acryloyl radical such as β-chloropropionyl, β-bromopropionyl, 3-phenylsulfonylpropionyl, 3-methylsulfonylpropionyl, 3-chloro-3-phenylsulfonylpropionyl, 2,3-dichloropropionyl, 2,3-dibromopropionyl; as well as 2-fluoro-2-chloro-3,3-difluorocyclobutane-1-carbonyl, 2,2,3,3-tetrafluorocyclobutane-1-carbonyl or -1-sulfonyl, β-(2,2,3,3-tetrafluorocyclobut-1-yl)-acryloyl, α- or β-alkenylsulfonylacryloyl or -arylsulfonylacryloyl groups, such as α- or β-methylsulfonylacryloyl, propiolyl, chloroacetyl, bromoacetyl, 4-(β-chloroethylsulfonyl)-butyryl, 4-vinylsulfonylbutyryl, 5-(β-chloroethylsulfonyl)-valeryl, 5-vinylsulfonylvaleryl, 6-(β-chloroethylsulfonyl)-caproyl, 6-vinylsulfonylcaproyl; as well as 4-fluoro-3-nitrobenzoyl, 4-fluoro-3-nitrophenylsulfonyl, 4-fluoro-3-methylsulfonylbenzoyl, 4-fluoro-3-cyanobenzoyl, and 2-fluoro-5-methylsulfonylbenzoyl.

Further examples of fibre reactive radicals X belong to the heterocyclic series, such as 2,4-dichlorotriazin-6-yl, monohalogenopyrimidinyl, dihalogenopyrimidinyl or trihalogenopyrimidinyl radicals, such as 2,4-dichloropyrimidin-6-yl, 2,4,5-trichloropyrimidin-6-yl, 2,4-dichloro-5-nitro or 5-methyl or 5-carboxymethyl- or -5-carboxy or -5-cyano or -5-vinyl- or -5-sulfo- or -5-monochloromethyl, -dichloromethyl- or -trichloromethyl- or 5-methylsulfonyl-6-pyrimidinyl, 2,5-dichloro-4-methylsulfonyl-6-pyrimidinyl, 2-fluoro-4-pyrimidinyl, 2,6-difluoro-4-pyrimidinyl, 2,6-difluoro-5-chloro-4-pyrimidinyl, 2-fluoro- 5,6-dichloro-4-pyrimidinyl, 2,6-difluoro-5-methyl-4-pyrimidinyl, 2,5-difluoro-6-methyl-4-pyrimidinyl, 2-fluoro-5-methyl-6-chloro-4- pyrimidinyl, 2-fluoro-5-nitro-6-chloro-4-pyrimidinyl, 2-fluoro-5-nitro-6-chloro-4-pyrimidinyl, 5-bromo-2-fluoro-4-pyrimidinyl, 2-fluoro-5-cyano-4-pyrimidinyl, 2-fluoro-5-methyl-4-pyrimidinyl, 2,5,6-trifluoro-4-pyrimidinyl, 5-chloro-6-chloromethyl-2-fluoro-4-pyrimidinyl, 2,6-difluoro-5-bromo-4-pyrimidinyl, 2-fluoro-5-bromo-6-chloromethyl-4-pyrimidinyl, 2,6-difluoro-5-chloromethyl-4-pyrimidinyl, 2,6-difluoro-5-nitro-4-pyrimidinyl, 2-fluoro-6-methyl-4-pyrimidinyl, 2-fluoro-5-chloro-6-methyl-4-pyrimidinyl, 2-fluoro-5-chloro-4-pyrimidinyl, 2-fluoro-6-chloro-4-pyrimidinyl, 6-trifluoromethyl-5-chloro-2-fluoro-4-pyrimidinyl, 6-trifluoromethyl-2-fluoro-4-pyrimidinyl, 6-trifluoromethyl-2-fluoro-4-pyrimidinyl, 2-fluoro-5-nitro-4-pyrimidinyl, 2-fluoro-5-trifluoromethyl-4-pyrimidinyl, 2-fluoro-5-phenyl- or 5-methylsulfonyl-4-pyrimidinyl, 2-fluoro-5-carboxamido-4-pyrimidinyl, 2-fluoro-5-carbomethoxy-4-pyrimidinyl, 2-fluoro-5-bromo-6-trifluoromethyl-4-pyrimidinyl, 2-fluoro-6-carboxamido-4-pyrimidinyl, 2-fluoro-6-carbo- methoxy-4-pyrimidinyl, 2-fluoro-6-phenyl-4-pyrimidinyl, 2-fluoro-6-cyano-4-pyrimidinyl, 2,6-difluoro-5-methyl- sulfonyl-4-pyrimidinyl, 2-fluoro-5-sulfonamido-4-pyrimidinyl, 2-fluoro-5-chloro-6-carbomethoxy-4-pyrimidinyl, 2,6-difluoro-5-trifluoromethyl-4-pyrimidinyl; 2,4-bismethyl- sulfonyl-pyrimidin-4-yl, 2,5-bismethylsulfonyl-5-chloropyrimidin-4-yl, 2-methylsulfonylpyrimidin-4-yl, 2-phenylsulfonylpyrimidin-4-yl, 2-methylsulfonyl-5-chloro-6-methylpyrimidin-4-yl, 2-methylsulfonyl-5-bromo-6-methylpyrimidin-4-yl, 2-methylsulfonyl-5-chloro-6-ethylpyrimidin-4-yl, 2-methylsulfonyl-5-chloromethyl-pyrimidin-4-yl, 2-methylsulfonyl-5-nitro-6-methyl-pyrimidin-4-yl, 2,5,6-trismethylsulfonylpyrimidin-4-yl, 2-methylsulfonyl-5,6-dimethylpyrimidin-4-yl, 2-ethyl-sulfonyl-5-chloro-6-methylpyrimidin-4-yl, 2-methyl-sulfonyl-6-chloropyrimidin-4-yl, 2,6-bismethylsulfonyl-5-chloropyrimidin-4-yl, 2-methylsulfonyl-6-carboxypyrimidin-4-yl, 2-methylsulfonyl-5-sulfopyrimidin-4-yl, 2-methylsulfonyl- 6-carbomethoxypyrimidin-4-yl, 2-methylsulfonyl-5-carboxypyrimidin-4-yl, 2-methyl-sulfonyl-5-cyano-6-methoxypyrimidin-4-yl, 2-methyl-sulfonyl-5-chloropyrimidin-4-yl, 2-sulfoethylsulfonyl-6-methylpyrimidin-4-yl, 2-methylsulfonyl-5-bromopyrimidin-4-yl, 2-phenylsulfonyl-5-chloropyrimidin-4-yl, 2-carboxymethylsulfonyl-5-chloro-6-methyl-pyrimidin-4-yl, 2,4-dichloropyrimidine-6-carbonyl or -6-sulfonyl, 2,4-dichloropyrimidine-5-carbonyl or -5-sulfonyl, 2-chloro-4-methylpyrimidine-5-carbonyl, 2-methyl-4-chloropyrimidine-5-carbonyl, 2-methylthio-4-fluoropyrimidine-5-carbonyl, 6-methyl-2,4-dichloropyrimidine-5-carbonyl, 2,4,6-trichloropyrimidine-5-carbonyl, 2,4-di-chloropyrimidine-5-sulfonyl, 2,4-dichloro-6-methylpyrimidine-5-carbonyl or -5-sulfonyl, 2-methylsulfonyl-6-chloropyrimidine-4- and -5-carbonyl, 2,6-bis(methylsulfonyl)pyrimidine-4- or -5-carbonyl, 2-ethylsulfonyl-6-chloropyrimidine-5-carbonyl, 2,4-bis(methylsulfonyl)-pyrimidine-5-sulfonyl, 2-methylsulfonyl-4-chloro-6-methylpyrimidine-5-sulfonyl or -5-carbonyl, 2-chloroquinoxaline-3-carbonyl, 2- or 3-monochloroquinoxaline-6-carbonyl, 2- or 3-monochloroquinoxa-line-6-sulfonyl, 2,3-dichloroquinoxaline-5- or -6-carbonyl, 2,3-dichloroquinoxaline-5- or -5-sulfonyl, 1,4-dichlorophthalazine-6-sulfonyl- or -6-carbonyl, 2,4-dichloroquinazoline-7- or -6-sulfonyl or carbonyl, 2,4,6-trichloroquinazoline-7- or -8-sulfonyl, 2- or 3- or 4-(4′, 5′-dichloropyridazin-6′-on-1-yl)phenylsulfonyl- or carbonyl, β-(4′, 5′-di-chloropyridaz-6′-one-1′-yl)propionyl, 3,6-dichloropyridazine-4-carbonyl or -4-sulfonyl, 2-chlorobenzothiazole-5- or -6-carbonyl or -5- or -6-sulfonyl, 2-arylsulfonyl- or -alkylsulfonylbenzothiazole-5- or -6-carbonyl or -5- or -6-sulfonyl, such as 2-methylsulfonylbenzothiazole or 2-ethyl-sulfonylbenzothiazole-5- or -6-sulfonyl or -carbonyl, 2-phenylsulfonylbenzothiazole-5- or -6-sulfonyl- or carbonyl and the corresponding 2-sulfonylbenzothiazole-5- or -6-carbonyl or -sulfonyl derivatives which contain sulfo groups in the fused-on benzene ring, 2-chlorobenzoxazole-5- or -6-carbonyl or -sulfonyl, 2-chlorobenzimidazole-5- or -6-carbonyl or -sulfonyl, 2-chloro-1-methylbenzimidazole-5- or -6-carbonyl or -sulfonyl, 2-chloro-4-methylthiazole-(1,3)-5-carbonyl) or -4- or -5-sulfonyl; ammonium-containing triazine rings, such as 2-trimethylammonium-4-phenylamino-or 4-(o-, m- or p-sulfophenyl-)amino-6-triazinyl, 2-(1,1-dimethylhydrazinium)-4-phenylaminotriazin-6-yl, 2-(1,1-dimethylhydrazinium)-4-(o-, m- or p-sulfophenyl)aminotriazin-6-yl, 2-(2-isopropylidene-1,1-dimethyl)hydrazinium-4-phenylamino-triazin-6-yl, 2-(2-isopropylidene-1,1-dimethyl)-hydrazinium-4-(o-, m- or p-sulfophenyl)aminotriazin-6-yl, 2-N-aminopyrrolidinium- or 2-N-aminopiperidinium-4-phenyl-aminotriazin-6-yl or -4-(o-, m- or p-sulfophenyl)amino-triazin-6-yl, and also 4-phenylaminotriazin-6-yl and 4-(sulfophenylamino)triazin-6-yl radicals which contain 1,4-bisazabicyclo[2.2.2]octane or 1,2-bisazabicyclo[0.3.3]-octane bonded via a quaternary nitrogen bond in the 2-position, 2-pyridinium-4-phenylaminotriazin-6-yl or 2-pyridinium-4-(o-, m- or p-sulfophenyl)aminotriazin-6-yl as well as the corresponding 2-oniumtriazin-6-yl radicals which are substituted in the 4-position by alkylamino, such as methylamino, ethylamino or β-hydroxyethylamino, alkoxy, such as methoxy or ethoxy, or alkyloxy, such as phenoxy, or sulfophenoxy groups.

Particularly interesting fibre-reactive radicals are fluoro-1,3,5-triazine radicals of the formula

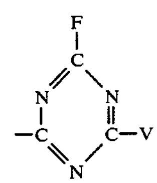

where in particular the following can be used as the substituent V on the triazine ring: $-NH_2$, alkylamino, N,N-dialkylamino, cycloalkylamino, N,N-dicycloalkylamino, aralkylamino and arylamino groups, mixed substituted amino groups, such as N-alkyl-N-cyclohexylamino and N-alkyl-N-arylamino groups, amino groups which contain heterocyclic radicals which can feature further fused-on carbocyclic rings, amino groups in which the amino nitrogen atom is part of an N-heterocyclic ring which can contain further heteroatoms, and hydrazino and semicarbazido. The abovementioned alkyl radicals can be straight-chain or branched and be of low molecular weight or higher molecular weight, preference being given to alkyl radicals having 1 to 6 carbon atoms; suitable cycloalkyl, aralkyl and aryl radicals are in particular cyclohexyl, benzyl, phenethyl, phenyl and naphthyl radicals; heterocyclic radicals are in particular furan, thiophene, pyrazole, pyridine, pyrimidine, quinoline, benzimidazole, benzothiazole and benzoxazole radicals; and amino groups in which the amino nitrogen is part of an N-heterocyclic ring are preferably radicals of six-membered N-heterocyclic compounds which can contain the further heteroatoms nitrogen, oxygen or sulfur. The abovementioned alkyl, cycloalkyl, aralkyl and aryl radicals, the heterocyclic radicals and the N-heterocyclic rings can be further substituted, for example by: halogen, such as fluorine, chlorine and bromine, nitro, cyano, trifluoromethyl, sulfamoyl, carbamoyl, $C_{1-4}$-alkyl, $C_{1-4}$-alkoxy, acylamino groups, such as acetylamino or benzoylamino, ureido, hydroxyl, carboxyl, sulfomethyl or sulfo. Examples of amino groups of this type are: —$NH_2$, methylamino, ethylamino, propylamino, isopropylamino, butylamino, hexylamino, β-methoxyethylamino, γ-methoxypropylamino, β-ethoxyethylamino, N,N-dimethylamino, N,N-diethylamino, β-chloroethylamino, β-cyanoethylamino, γ-cyanopropylamino, β-carboxyethylamino, sulfomethylamino, β-sulfoethylamino, β-hydroxyethylamino, N,N-di-β-hydroxyethylamino, γ-hydroxypropylamino, benzylamino, phenethylamino, cyclohexylamino, phenylamino, toluidino, xylidino, chloroanilino, anisidino, phenetidino, N-methyl-N-phenylamino, N-ethyl-N-phenylamino, N-β-hydroxyethyl-N-phenylamino, 2-, 3- or 4-sulfoanilino, 2,5-disulfoanilino, 4-sulfomethylanilino, N-sulfomethylanilino, 2-, 3- or 4-carboxyphenylamino, 2-carboxy-5-sulfophenylamino, 2-carboxy-4-sulfophenylamino, 4-sulfonaphth-1-ylamino, 3,6-disulfonaphth-1-ylamino, 3,6,8-trisulfonaphth-1-ylamino, 4,6,8-trisulfonaphth-1-ylamino, 1-sulfonaphth-2-ylamino, 1,5-disulfonaphth-2-ylamino, 6-sulfonaphth-2-ylamino, morpholino, piperidino, piperazino, hydrazino and semicarbazido.

The reactive dyes of the formula (1) can contain up to six reactive groups of identical or different types.

The reactive dyes of the formula (1) preferably contain highly reactive radicals X. These are to be understood as meaning radicals X which are more reactive than 2-chloro-1,3,5-triazinyl radicals which are substituted in the 4-position by one of the abovementioned substituents V. Examples of these highly reactive radicals X are: 2-fluoro-4-(V)-triazin-6-yl, where V is one of the substituents given above for V, 2,4-dichlorotriazin-6-yl, 2,4-dichloropyrimidine-5-carbonyl, 5-cyano- or 5-methylsulfonyl-2,4-dichloropyrimidin-6-yl, difluorochloropyrimidinyl, such as 2,4-difluoro-5-chloropyrimidin-6-yl, 2,3-dichloroquinoxaline-6-carbonyl, vinylsulfonyl, β-sulfatoethylsulfonyl, β-chloroethylsulfonyl β-thiosulfatoethylsulfonyl, β-acetoxyethylsulfonyl.

Particular preference is given in the process according to the invention to the print pastes which contain at least one reactive dye of the formula (2) in which X is a radical of the formula

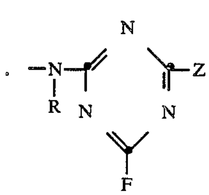

(3)

in which R is hydrogen or $C_{1-4}$-alkyl, such as methyl, ethyl, propyl, isopropyl, butyl, sec.-butyl, isobutyl or tert.-butyl, and Z is a substituted or unsubstituted amino group, a difluorochloropyrimidinyl radical bonded via an —N(R)— group or is a vinylsulfonyl, β-sulfatoethylsulfonyl, β-thiosulfatoethylsulfonyl β-chloroethylsulfonyl or β-acetoxyethylsulfonyl radical which is bonded directly or via an aliphatic bridge member.

The reactive dyes of the formula (1) are derived in particular from the following dyes:

1. Monoazo compounds of the formula

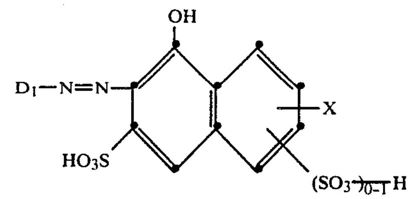

(4)

in which $D_1$ is a radical of the benzene or naphthalene series, for example a phenyl, naphthyl, stilbene, diphenyl, benzothiazolylphenyl or diphenylamine radical which can be substituted by sulfo groups, halogen, for example chlorine, ethylamino groups, for example ethylamino or benzoylamino amino groups, for example —$NH_2$ or methylamino, alkoxy, for example methoxy, hydroxyl, carboxyl or fibre-reactive radicals X, X is preferably bonded to the 5-, 6-, 7- or 8-position of the naphthalene nucleus directly or via an amino group, for example —$NH_2$ or —$NHCH_3$, and is as defined under the formula (1).

2. Disazo compounds of the formula (4) in which $D_1$ is a radical of the azobenzene, azonaphthalene or phenylazonaphthalene series and $D_1$ and the naphthalene nucleus can be substituted as indicated in class 1.

3. Disazo compounds of the formula

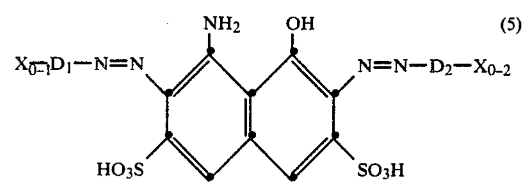

(5)

in which X is as defined under the formula (1) and $D_1$ and $D_2$, independently of each other, are defined in the same way as $D_1$ was under the formula (4).

4. Monoazo compounds of the formula

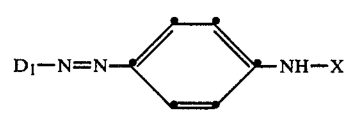

(6)

in which $D_1$ is a radical indicated under the formula (4), in particular a disulfonaphthyl or stilbene radical, X is as defined under the formula (1), and the benzene nucleus can contain further substituents, for example halogen atoms or alkyl, alkoxy, carboxyl, ureido or acylamino groups.

5. Monoazo or disazo compounds of the formula $$X{-}D_1{-}N{=}N{-}K_1 \quad (7)$$

in which $D_1$ is a radical of the azobenzene, azonaphthalene or phenylazonaphthalene series or is preferably a radical of the benzene or naphthalene series which can be substituted by the substituents given for $D_1$ under the formula (4), $K_1$ is the radical of a naphthosulfonic acid or the radical of a ketomethylene compound, for example an acetoacetarylide, in particular acetoacetanilide, or a 5-pyrazolone, in particular a 1-phenyl-3-methyl-5-pyrazolone, where the OH group is adjacent to the azo group, and X is bonded to $D_1$ directly or via an amino group, for example via —$NH_2$, methylamino or benzoylamino. $D_1$ preferably is a radical of the benzene series which contains a sulfo group.

6. Monoazo or disazo compounds of the formula $$D_1—N{=}N—K_2—X \quad (8)$$

in which $D_1$ is a radical defined above for $D_1$ in classes 1 and 2, $K_2$ is the radical of an enolisable ketomethylene compound, for example an acetoacetarylide, in particular acetoacetanilide, or a 5-pyrazolone, in particular a 1-phenyl-3-methyl-5-pyrazolone, where the OH group is adjacent to the azo group, and X is as defined in classes 1 to 4.

7. Metal complex compounds, for example copper, chromium and cobalt complexes, of dyes of the formulae (4) to (8) in which $D_1$, $K_1$ and $K_2$ are as defined above and, additionally, contain a metallisable group, for example a hydroxyl, methoxy or carboxyl group, adjacent to the azo group.

8. Anthraquinone compounds which contain the radical X bonded to an alkylamino or arylamino group which is itself bonded to the α-position of the anthraquinone nucleus, in particular anthraquinone compounds of the formula

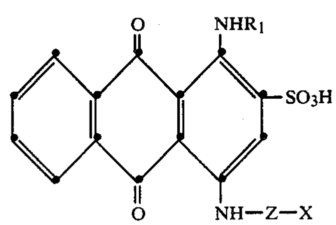

(9)

in which $R_1$ is hydrogen, alkyl or aryl, in particular phenyl, and Z is a bridge member which is predominantly a divalent radical of the benzene series, for example a phenylene, diphenylene or 4,4'-stilbene or azo benzene radical. Z should preferably contain a sulfo group for every benzene ring present. The anthraquinone nucleus can additionally contain a sulfo group in the 5-, 6-, 7- or 8-position. The radical X is bonded to Z directly or via an amino group.

9. Phthalocyanine compounds of the formula $$Pc\begin{cases}(SO_2—W)_n \\ (SO_2NH—Z—X)_m\end{cases} \quad (10)$$

in which Pc is a phthalocyanine nucleus, preferably copper phthalocyanine, W—OH and/or —$NH_2$, Z is a bridge member, preferably an aliphatic, cycloaliphatic or aromatic bridge, and n and m are each 1, 2 or 3 and can be identical or different provided that n+m is not greater than 4. The phthalocyanine compounds preferably contain a water-solubilising group, for example a sulfo group, and a —Z— N(R)—X group in which R is hydrogen or alkyl and X is as defined under the formula (1).

10. Nitro dyes of the formula $$O_2N—D_2—N\begin{cases}Z_1 \\ Q\end{cases} \quad (11)$$

in which D is a naphthalene nucleus or benzene nucleus which can be further substituted, the nitrogen atom N is in the o-position relative to the nitro group, $Z_1$ is hydrogen or a substituted or unsubstituted hydrocarbon radical and Q is hydrogen or an organic radical which is bonded to the nitrogen through a carbon atom, and in which Q and $Z_1$ are not both hydrogen, and Q bonded to $Z_1$ is a hydrocarbon radical or to $D_2$ in the ortho-position relative to the nitrogen atom N to form a heterocyclic ring, and which contain at least one radical X, in particular an —N(R)—X radical in which R is hydrogen or alkyl and X is as defined under the formula (1); in particular nitro dyes of the formula $$\underset{\substack{| \\ NO_2}}{V}—NH—B—N(R)—X \quad (12)$$

in which V and B are each monocyclic aryl nuclei and the nitro group in V is in the o-position relative to the —NH group.

11. Metal complexes of formazan dyes of the formula $$\left[Q_1—CH\begin{cases}N{=}N—A—Y_1 \\ N{=}N—B—Y_2\end{cases}\right]—(X)_n \quad (13)$$

in which $Q_1$ is an organic radical or a nitro or cyano group, A and B are each radicals of diazo components of the benzene, naphthalene or heterocyclic series, and $Y_1$ and $Y_2$ are both substituents which are bonded in the o-position relative to the azo group and are capable of complexing with a heavy metal, X is as defined under the formula (1), and n is 1 or 2.

The radical $Q_1$ is in particular a radical of the benzene series, for example phenyl or sulfophenyl, or an alkyl radical, for example methyl, a low molecular weight alkanoyl group, for example acetyl, a carbalkoxy group having up to 4 carbon atoms, a benzoyl group or a heterocyclic radical, and A and B are each preferably sulfo-, sulfonamido- or alkylsulfonyl-substituted phenyl radicals. $Y_1$ and $Y_2$ are each in particular OH and COOH groups. Suitable heavy metals are copper, chromium, cobalt and nickel.

12. Dioxazines of the formula

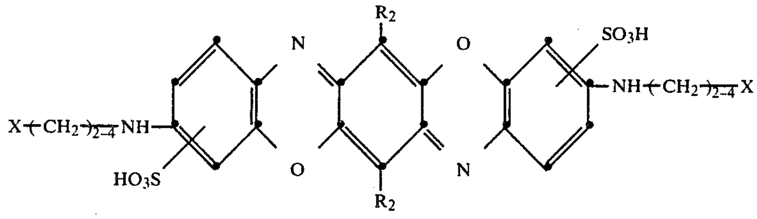

(14)

in which $R_2$ is $C_{1-4}$-alkyl, for example methyl, or halogen, for example chlorine, and X is as defined under the formula (1).

Very particular preference is given in the process according to the invention to print pastes which contain a reactive dye of the formula

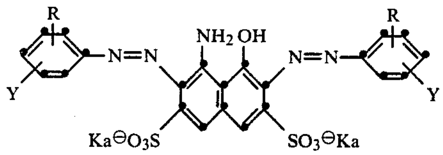

(15)

in which one Y is a 2-fluoro-1,3,5-triazinyl-6-amino radical which is substituted in the 4-position by a substituted or unsubstituted amino group, in particular one of the radicals denoted by V, or a β-sulfatoethylsulfonyl radical, and the other Y is a β-sulfatoethylsulfonyl radical or $—SO_3^{\ominus}Ka$, one R is hydrogen and the other R is hydrogen or $—SO_3^{\ominus}Ka$, and Ka is a cation, a sodium alginate thickening and for each fibre-reactive leaving group or for each activated double bond at least 3 times the stoichiometric amount of sodium propionate plus water and can, if desired, also contain oxidising agents.

The cation Ka in the formulae (2) and (15) is a hydrogen, sodium, potassium, lithium or ammonium ion or the cation of an organic amine, for example of triethanolamine.

The process according to the invention is distinguished from known processes using sodium hydrogencarbonate as the fixing alkali by a distinctly better shelflife of the print pastes used and an unexpectedly high obtainable degree of fixation.

The invention also provides long-shelflife print pastes containing (a) at least one water-soluble reactive dye of the formula $$D—(X)_m \qquad (1)$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aromatic or heterocyclic series which is bonded to the radical D either directly or via a bridge member and m is 1, 2, 3, 4, 5 or 6, if desired, a disperse dye and (b) salts of aliphatic carboxylic acids having 3 to 18 carbon atoms, and their use for printing textile materials.

Preference is given to print pastes which contain a water-soluble reactive dye of the formula (2), in particular in which X in the formula (2) is as defined under formula (3), and which contain the abovementioned preferred salts of aliphatic carboxylic acids and can, if desired, also contain one of the indicated solubilisers, in particular dicyanodiamide, and alginates or emulsions as thickening agents. Preference is also given to print pastes which contain a disperse dye and a reactive dye.

The following examples serve to illustrate the invention. The parts and percentages are by weight. The temperatures are given in degrees centigrade. Parts by weight relate to parts by volume as the gram relates to the cubic centimeter.

EXAMPLE 1

6 parts of the reactive dye of the formula

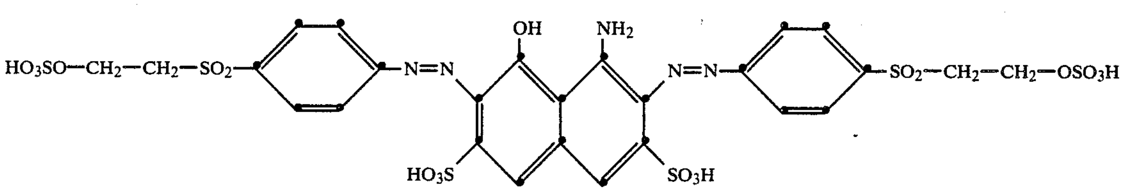

having an active substance content of 62% are sprinkled with high-speed stirring into 94 parts of a stock thickening containing 50 parts of 5% sodium alginate thickening, 39.4 parts of water, 3.5 parts of sodium propionate, 1 part of sodium m-nitrobenzenesulfonate and 0.1 part of 40 per cent aqueous formaldehyde solution. The print paste thus obtained is used to print a mercerised cotton fabric, and the resulting printed fabric is dried and steamed at 103° C. in saturated steam for 8 minutes. The printed fabric is then rinsed and subsequently dried. A black print is obtained.

To document the improved print paste stability and the obtainable degree of fixation, Table 1 shows the degrees of fixation (calculated from the extinctions (at $\lambda_{max}$) of extraction solutions of (fixed and unfixed) prints which have not been washed off) obtained on printing with the print paste containing sodium propionate as fixing alkali a mercerised cotton fabric (add-on level: 900 g of paste per kilo of substrate), after the print paste has been stored at 42° C. for the indicated period, drying the resulting printed fabric at 120° C. for 2 minutes, and then steaming it at 103° C. in saturated steam for 8 minutes.

TABLE 1

| Storage time (at 42° C.) | Degree of fixation |
|---|---|
| used at once | 96% |

TABLE 1-continued

| Storage time (at 42° C.) | Degree of fixation |
|---|---|
| 57 days | 94% |
| 105 days | 91% |

The procedure is repeated with a print paste which, in addition to all additives as indicated above, additionally contains 100 g of urea per kilogram of print paste, affording the following storage time and degree of fixation values indicated in Table 2:

TABLE 2

| Storage time (at 42° C.) | Degree of fixation |
|---|---|
| used at once | 81% |
| 57 days | 54% |

Table 2 documents the marked reduction of the degree of fixation through additional use of urea as a solubiliser.

COMPARATIVE EXAMPLE 2

4 parts of the reactive dye specified in Example 1 are sprinkled with high-speed stirring into 96 parts of a stock thickening containing 50 parts of 5% sodium alginate thickening, 42.4 parts of water, 2.5 parts of sodium hydrogencarbonate, 1 part of sodium m-nitrobenzenesulfonate and 0.1 part of 40 per cent aqueous formaldehyde solution. The print paste thus obtained is used to print a mercerised cotton fabric, and the resulting printed fabric is dried and steamed at 103° C. in saturated steam for 8 minutes. The printed fabric is then rinsed and subsequently dried.

To·document the print paste stability, the procedure of Example 1 is repeated exactly, affording the degrees of fixation set out in Table 3.

TABLE 3

| Storage time (at 42° C.) | Degree of fixation Print paste B |
|---|---|
| at once | 91% |
| 1 day | 90% |
| 7 days | 64% |
| 28 days | 50% |
| 56 days | 44% |
| 70 days | 36% |

The above Example 1 is repeated, except that in the print paste the amount of sodium propionate is replaced by 2 parts of sodium acetate (×3 $H_2O$) and 10 parts of the specified reactive dye used, producing a ratio of fixing alkali to reactive alkali as specified in Example 3 of German Auslegeschrift No. 1,916,627 and affording, on the mercerised cotton fabric after steaming at 103° C. in saturated steam for 8 minutes, a degreee of fixation of about 20% and, after steaming at 112° C. under 0.5 atmosphere gauge in a star ager for 20 minutes in accordance with Example 3 of said German Auslegeschrift, a degree of fixation of about 75%. By comparison, the print paste used in the above example, which contains sodium propionate, produces a distinctly higher degree of fixation (96%).

Example 1 is repeated, except that the 6 parts of the reactive dye specified there are replaced by 6 parts of one of the reactive dyes specified hereinafter, affording with sodium propionate as the fixing alkali similar advantages as indicated in Example 1:

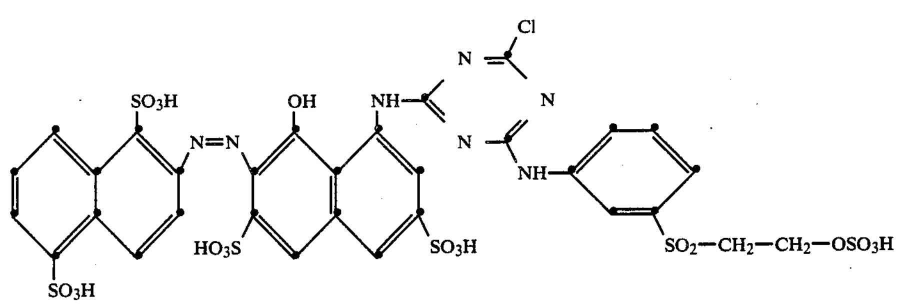

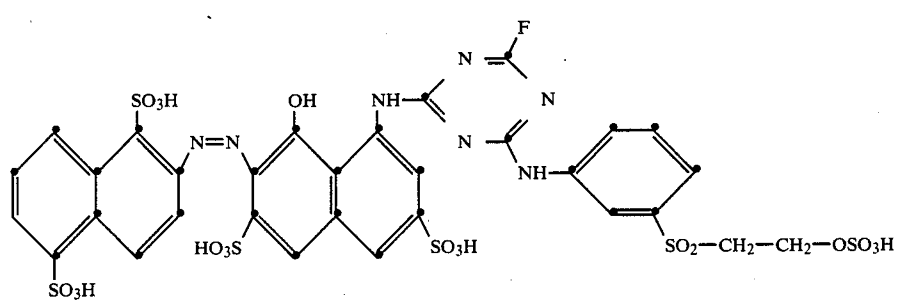

-continued

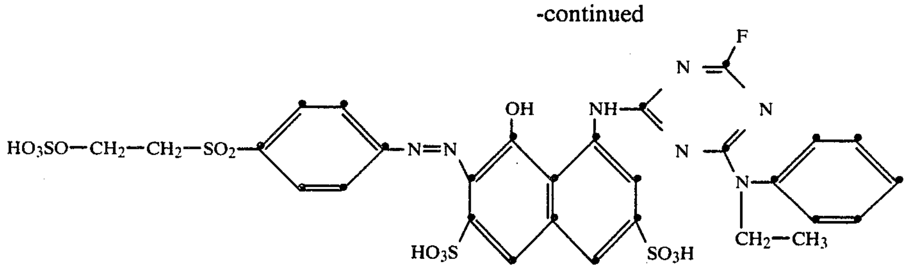

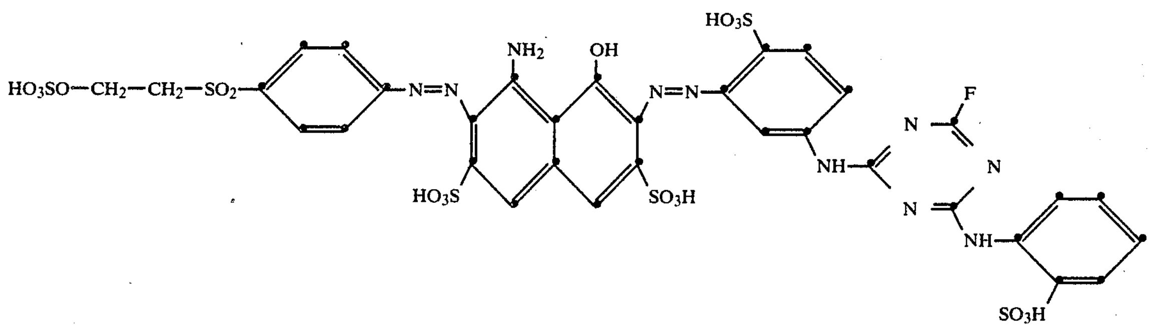

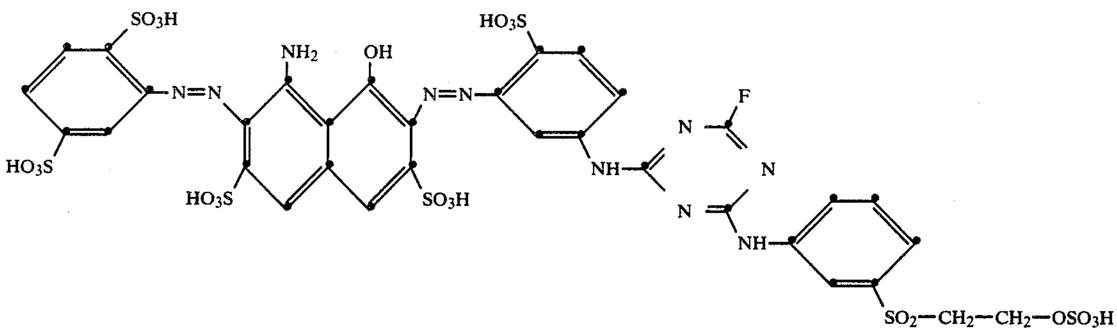

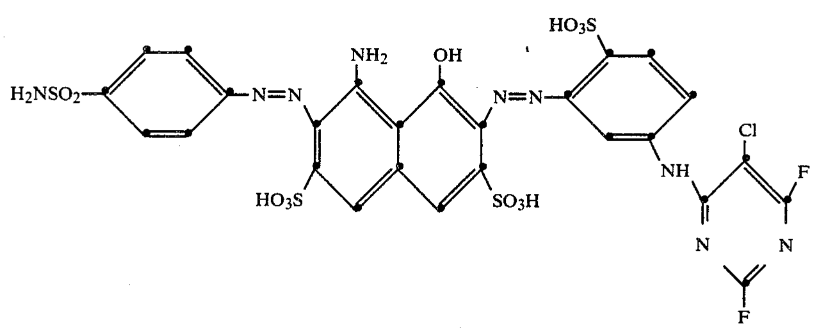

EXAMPLE 2

Print paste A 6 parts of the reactive dye of the formula

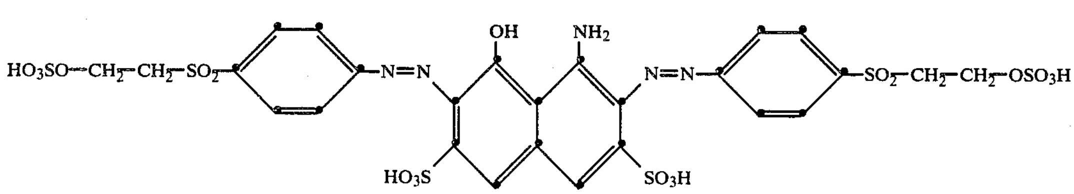

having an active subtance content of 62% are sprinkled with high-speed stirring into 94 parts of a stock thickening containing 50 parts of 5 per cent sodium alginate thickening, 38.9 parts of water, 4 parts of sodium butyrate, 1 part of sodium m-nitrobenzensulfonate and 0.1 part of 40 per cent aqueous formaldehyde solution.

The print pastes thus obtained are used to print a mercerised cotton fabric, and the resulting printed fabric is dried and steamed at 103° C. in saturated steam for 8 minutes. The printed fabric is then rinsed and subsequently dried. A black print is obtained.

The procedure is repeated except that the 4 parts of sodium butyrate are replaced by 6.5 parts of sodium caprylate (print paste B) and as comparative example 4 parts of sodium butyrate and additionally 10 parts of urea (print paste C), likewise affording black prints.

To doument the improved print paste stability and the obtainable degree of fixation, Table 4 shows the degrees of fixation (calculated from the extinctions (at $\lambda_{max}$) of extraction solutions of (fixed and unfixed) prints which have not been washed off) obtained on printing with the print paste containing the indicated fixing alkali a mercerised cotton fabric (add-on Level: 900 g of past per kilo of substrate), after the print paste has been stored at 42° C. for the indicated period, drying the resulting printed fabric at 120° C. for 2 minutes, and then steaming it at 103° C. in satureated steam for 8 minutes.

TABLE 4

| Storage time (at 42° C.) | Degree of fixation Print paste A | Print paste B | Print paste C |
|---|---|---|---|
| used at once | 97% | 96% | 83% |
| 57 days | 95% | 83% | 39% |

EXAMPLE 3

Print paste A 4 parts of the reactive dye of the formula

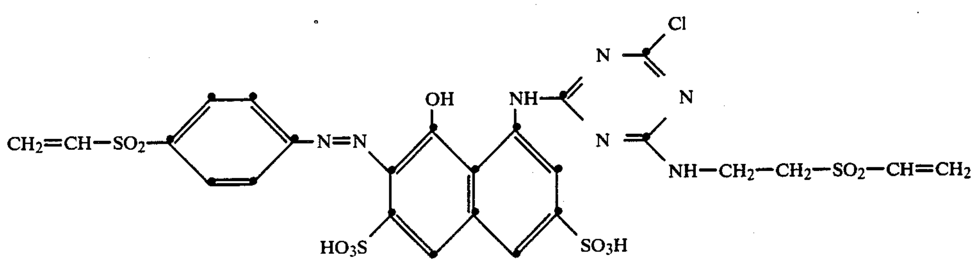

having an active substance content of 70 per cent are sprinkled with high-speed stirring into 96 parts of a stock thickening containing 50 parts of 5 per cent sodium alginate thickening, 41.9 parts of water, 3 parts of sodium propionate, 1 part of sodium m-nitrobenzenesulfonate and 0.1 part of 40% aqueous formaldehyde solution.

Print paste B

The same ingredients as in print paste A are used, except that the 3 parts of sodium propionate are replaced by 5.5 parts of sodium caprylate and the 41.9 parts of water are replaced by 39.4 parts of water.

Print paste C

The same ingredients as in print paste A are used, except that the 3 parts of sodium propionate are replaced by 3 parts of sodium propionate and 4 parts of dicyanodiamide and the 41.9 parts of water are replaced by 37.9 parts of water.

Print paste D

The same ingredients as in print paste A are used, except that the 3 parts of sodium propionate are replaced by 5.5 parts of sodium caprylate and 4 parts of dicyanodiamide and the 41.9 parts of water are replaced by 35.4 parts of water.

The print pastes A to D thus obtained are used to print a mercerised cotton fabric or viscose, and the resulting printed fabric is dried and steamed at 103° C. in saturated steam for 8 or 12 minutes respectively.

The printed fabric is then rinsed and subsequently dried.

To document the obtainable degree of fixation, Table 5 shows the degrees of fixation (calculated from the extinctions (at $\lambda_{max}$) of the extraction solutions of fabric samples of (fixed and unfixed) prints which have not been washed off), obtained on using the print paste containing the indicated fixing alkali to print a mercerised cotton fabric or viscose (add-on in the case of cotton: 900 g of paste per kilogram of substrate; add-on in the case of viscose: 1000 g of paste per kilogram of substrate), drying the resulting printed fabric at 120° C. for 2 minutes and steaming at 103° C. in saturated steam for 8 or 12 minutes respectively.

TABLE 5

| Print paste | Degree of fixation on cotton at 103° C. saturated steam for 8 minutes | on cotton 12 minutes | on viscose at 103° C. saturated steam for 8 minutes | on viscose 12 minutes |
|---|---|---|---|---|
| A | 90% | 94% | 58% | 72% |
| B | 91% | 95% | 60% | 72% |
| C | 87% | 90% | 86% | 92% |
| D | 85% | 90% | 82% | 92% |

The data indicated in Table 5 all relate to the procedure according to the invention, which produces high degrees of fixation.

EXAMPLE 4

Print paste A 1.5 parts of the reactive dye indicated in Example 3 with an active substance content of 84% are sprinkled with high-speed stirring into 98.5 parts of a stock thickening.

The 98.5 parts of the stock thickening are obtained by mixing together 23 parts of a 5 per cent sodium alginate thickening, 6.5 parts of the potassium salt of oleic acid, 0.5 part of sodium m-nitrobenzenesulfonate, 0.1 part of a 40 per cent aqueous formaldehyde solution and 68.4 parts of water and boiling up.

Print paste B

The same procedure as for preparing print paste A is repeated, except that the amount of water is reduced to 63.4 parts and the 5 per cent sodium alginate thickening to 18 parts and 10 parts of urea are added.

The print pastes thus obtained are used to print a mercerised cotton fabric, and the resulting printed fabric is dried and steamed at 103° C. in saturated steam for 8 or 12 minutes. The printed fabric is then rinsed and subsequently dried.

To document the obtainable degree of fixation, the procedure of Example 3 is repeated exactly, producing the degrees of fixation indicated in Table 6 below.

TABLE 6

| Print paste | Degree of fixation on cotton at 103° C. saturated steam for 8 minutes | 12 minutes |
|---|---|---|
| A | 80% | 84% |
| B | 64% | 64% |

A further useful fixing alkali is the potassium salt of 2,4-hexadiene acid (potassium sorbate), the degree of fixation decreasing considerably on addition, per kg, of 100 g of urea.

EXAMPLE 5

Print paste A 2 parts of the dye of the formula

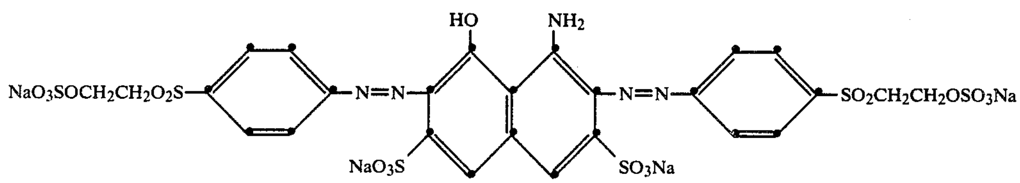

and 4 parts of liquid low-dispersant mixture of the dyes of the folrmulae (I)

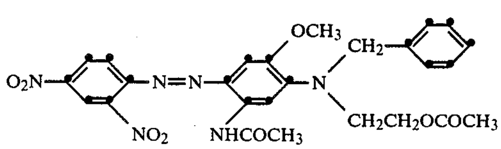

and (II)

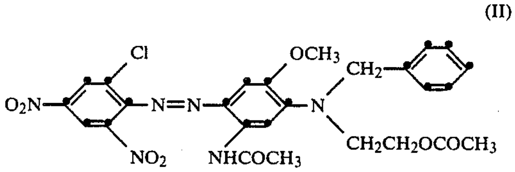

consisting of 25 per cent by weight of the dye of the formular (I) and 75 per cent by weight of the dye of the formula (II) are dissolved or dispersed with high-speed stirring in 94 parts of a stock thickening containing 50 parts of 5 per cent sodium alinate thickening, 3 parts of Na propionate, 1 part of sodium m-nitrobenzenesulfonate, and 4 parts of water.

The print past thus obtained is used to print a fabric containing 50 parts of bleached cottom and 50 parts of a polyester staple yarn. The printed fabric is dried and steamed at 170° C. for 8 minutes without superatmospheric pressure. The fixed print is then washed cold and hot and dried. A black, level print is obtained.

Print paste B

The procedure for preparing print paste A is repeated, expect that the 3 parts of sodium propionate are replaced by 2 parts of sodium carbonate and the 4 parts of water are replaced by 5 parts of water.

The prints resulting form print paste B are, compared with the prints resulting from print paste A, visually less strong. This is also found in the degrees of fixation of the reactive dye on the cotton portion at the blend fabric (Table 7).

TABLE 7

| | Degree of fixation of reactive dye on the cotton portion |
|---|---|
| Print paste A | 90% |
| Print paste B | 83% |

The above example is repeated, except that the reactive dye indicated there is replaced by 2 parts of the reactive dye of the formula

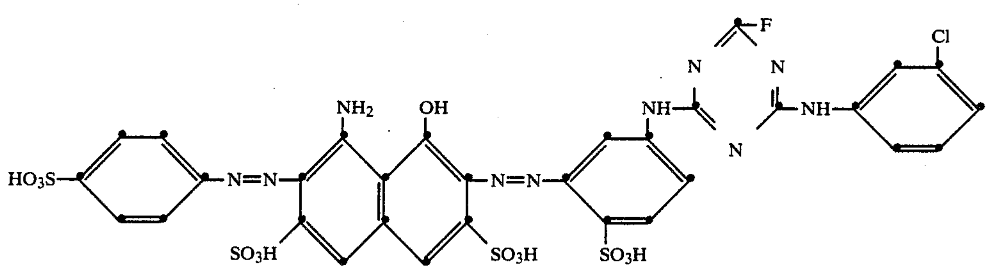

affording, after prolonged storage of the print pastes, a higher degree of fixation of the reactive dye on the cotton portion with print paste A than with print paste B.

EXAMPLE 6

Print paste A 4 parts of the reactive dye of the formula

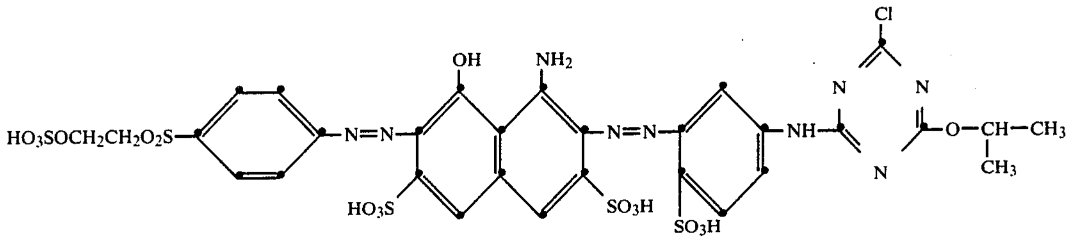

are incorporated with high-speed stirring into 96 parts of a stock thickening containing 3 parts of Na propionate, 1 part of sodium m-nitrobenzenesulfonate and 92 parts of a 5.5 per cent solution of a low-viscosity Na alginate.

This print paste is used to print a mercerised cotton fabric, which is dried and fixed at 102° C. in approximately saturated steam for 3 minutes. The customary wash leaves a navy shade of high depth of shade, which is also obtained when the print paste is stored beforehand at 40° C. for 14 days.

Print paste B

The procedure for preparing print paste A is repeated, except that the 3 parts of sodium propionate are replaced by 2 parts of sodium bicarbonate, and the 92 parts of 5.5 per cent solution of Na alginate are replaced by 93 parts of 5.5 per cent solution of Na alginate.

Print paste B results in prints which, compared with the prints obtained with print paste A, are distinctly less strong after a storage time of 14 days at 40° C. This is also shown by the degrees of fixation indicated in Table 8.

TABLE 8

| | Degree of fixation on cotton | |
|---|---|---|
| | Print paste used at once | Print paste used after 14 days |
| Print paste A | 92% | 92% |
| Print paste B | 94% | 58% |

We claim:

1. A process for printing cellulosic fibres or cellulose-containing blend fibres with reactive dyes or dye mixtures which contain a reactive dye and subsequent fixation, which comprises printing these materials with an alkaline print paste consisting essentially of (a) at least one water-soluble reactive dye of the formula $$D-(X)_m \quad (1)$$

in which D is the radical of an organic dye of the monoazo, polyazo, metal complex azo, anthraquinone, phthalocyanine, formazan, azomethine, nitroaryl, dioxazine, phenazine or stilbene series, X is a fibre-reactive radical of the aliphatic, aroamatic or heterocyclic series which is bonded to the radical D either directly or via a bridge member and m is 1, 2, 3, 4, 5, or 6, and (b) a salt of an aliphatic carboxylic acid having 3 to 18 carbon atoms, and subsequently fixing the print.

2. A process according to claim 1, wherein said at least one water-soluble reactive dye is of the formula $$[D-(X)_m + (SO_3^{\ominus}Ka)_n \quad (2)$$

in which D is the radical of a monoazo or disazo dye or a metal complex azo, anthraquinone, formazan or dioxazine dye, Ka is a cation and n is 1, 2, 3, 4, 5 or 6, and X and m are as defined in claim 1.

3. A process according to claim 2, wherein said at least one water-soluble reactive dye is of the formula (2) in which X is a radical of the formula

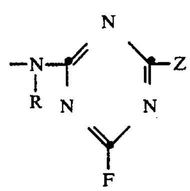

(3)

in which R is hydrogen or $C_{1-4}$-alkyl and Z is a substituted or unsubstituted amino group, a difluorochloropyrimidinyl radical which is bonded via an —N(-R)— group or a vinylsulfonyl, β-sulfatoethylsulfonyl, β-thiosulfatoethylsulfonyl, β-chloroethylsulfonyl or β-acetoxyethylsulfonyl radical which is bonded directly or via an aliphatic bridge member.

4. A process according to claim 1, wherein said salt in an alkali metal salt of a saturated or unsaturated, branched or unbranched monocarboxylic or dicarboxylic acid or a mixture thereof.

5. A process according to claim 4, wherein said alkali metal salt has 3 to 8 carbon atoms.

6. A process according to claim 5, wherein the alkali metal salt, is the sodium or potassium salt of a saturated monocarboxylic acid.

7. A process according to claim 6, wherein said salt is sodium propionate.

8. A process according to claim 1, wherein the print pastes used contain solubilisers for reactive dyes.

9. A process according to claim 8, wherein the solubilisers used are ε-caprolactam, thiodiethylene glycol, polyethylene glycol, pentaerythritol, acetin and dicyanodiamide.

10. A process according to claim 1, wherein the print pastes used contain, as thickening agents, alginates or emulsions.

11. A process according to claim 1, wherein the print pastes contain per fibre-reactive radical X at least one time the stoichiometric amount, of the salt of an aliphatic carboxylic acid.

12. A process according to claim 1, wherein the print paste used for printing polyester/cellulose blend fabrics additionally contains at least one disperse dye.

13. A process according to claim 1, wherein pure cellulosic fibres are printed and the reactive dyes are fixed at a temperature of 100° C. to 150° C. with steam in the course of 30 seconds to 12 minutes.

14. A process according to claim 12, wherein polyester/cellulose blend fabric is printed and the dyes are fixed at 100° C. to 220° C. with hot air, steam or superheated steam.

15. A process according to claim 11 wherein said stoichiometric amount of the salt of an aliphatic carboxylic acid is twice to five times the stoichiometric amount of fiber reactive radical.

16. An alkaline long-shelflife print past consisting essentially of:

a. at least one water-soluble reactive dye of the formula $$D-(X)_m$$

in which D is the radical of a monoazo, polyazo, metal complex azo, anthraquinone, phthalocyanine, formazan, azomethine, nitroaryl, dioxazine, phenazine or stilbene dye, X is a fibre-reative aliphatic, aromatic or heterocyclic radical which is bonded to the radical D either directly or via a bridge member and m is 1, 2, 3, 4, 5 or 6, and b. a salt of an aliphatic carboxylic acid having 3 to 18 carbon atoms in an amount sufficient to provide an alkaline pH.

17. A print paste according to claim 16 wherein at least one water soluble reactive dye is of the formula $$[D-(X)_m]-(SO_3^{\ominus}Ka)_n$$

in which D is the radical of a manoazo of disazo dye or a metal complex azo, anthraquinone, formazan or dioxazine dye, Ka is a cation and n is 1, 2, 3, 4, 5 or 6.

18. A print past according to claim 17 wherein X in said reactive dye is a radical of the formula

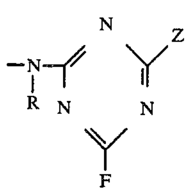

in which R is hydrogen or $C_1$–$C_4$-alkyl and z is a substituted or unsubstituted amino group, a difluorochloropyrimidinyl radical which is bonded via an —N(R)— group or a vinylsulfonyl, β-sulfatoethylsulfonyl, β-thiosulfatoethylsulfonyl, β-chloroethylsulfonyl or β-acetoxyethylsulfonyl radical which is bonded directly or via an aliphatic bridge member.

19. A print paste according to claim 16 wherein said salt is an alkali metal salt of a saturated or unsaturated, branched or unbranched monocarboxylic or dicarboxylic acid or a mixture thereof.

20. A print past according to claim 19 wherein said acid contains 3 to 8 carbon atoms.

21. A print paste according to claim 20, wherein said salt is a sodium or potassium salt of a saturated moncarboxylic acid.

22. A print paste according to claim 21 wherein said salt is sodium propionate.

23. A print paste according to claim 16 which further contains at least one disperse dye.

24. A print paste according to claim 16 which further contains at least one solubilizer for said reactive dye.

25. A print past according to claim 24 wherein said solubilizer is ε-caprolactam, thiodiethylene glycol, polyethylene glycol, pentaerythritol, acetin or dicyanodiamide.

26. A print paste according to claim 16 wherein said salt is present in an amount that is at least equal to the stoichiometric amount of fiber-reactive radical X.

27. A print past according to claim 26 wherein said salt is present in an amount that is two to five times the stoichiometric amount of fiber-reactive radical X.

28. An alkaline long-shelflife print paste which L comprises:

a. at least one water-soluble reactibe dye of the formula $$D-(X)_m$$

in which D is the radical of a monazo, polyazo, metal complex azo, anthraquinone, phthalocyanine, formazan, azomethine, nitroaryl, dioxazine, phenazine or stibene dye, X is a fibre-reactive aliphatic, aromatic or heterocyclic radical which is bonded to the radical D either directly or via a bridge member and m is 1, 2, 3, 4, 5, or 6, and b. a salt of an aliphatic carboxylic acid having 3 to 8 carbon atoms in an amount sufficient to provide an alkaline PH, c. a thickening agent, d. an oxidizing agent, e. formaldehyde, and f. water.

29. A print paste according to claim 28 which further comprises a solubilizer for said reactive dye.

30. A print paste according to claim 28 whrein said salt is sodium propionate or sodium butyrate, said oxidizing agent is m-nitrobenzene sulfonte, and said thickening agent is sodium alginate.

* * * * *